United States Patent
Prakah-Asante et al.

(10) Patent No.: US 10,035,510 B2
(45) Date of Patent: Jul. 31, 2018

(54) ADAPTIVE DRIVE CONTROL LOW-TRACTION DETECTION AND MODE SELECTION

(71) Applicant: FORD GLOBAL TECHNOLOGIES, LLC, Dearborn, MI (US)

(72) Inventors: Kwaku O. Prakah-Asante, Commerce Township, MI (US); Fling Tseng, Ann Arbor, MI (US); Steven Joseph Szwabowski, Northville, MI (US); Jianbo Lu, Northville, MI (US); Perry Robinson MacNeille, Lathrup Village, MI (US); Xiaoming Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/167,447

(22) Filed: May 27, 2016

(65) Prior Publication Data
US 2017/0341654 A1    Nov. 30, 2017

(51) Int. Cl.
*B60W 30/18*    (2012.01)
(52) U.S. Cl.
CPC ... *B60W 30/18172* (2013.01); *B60W 2400/00* (2013.01); *B60W 2520/14* (2013.01); *B60W 2550/148* (2013.01); *B60W 2720/26* (2013.01)

(58) Field of Classification Search
None
See application file for complete search history.

(56) References Cited

U.S. PATENT DOCUMENTS

| | | | |
|---|---|---|---|
| 7,349,776 B2 | 3/2008 | Spillane et al. | |
| 8,600,614 B2 | 12/2013 | Filev et al. | |
| 8,965,644 B2 | 2/2015 | Jeon et al. | |
| 9,139,204 B1 | 9/2015 | Zhao et al. | |
| 2003/0200016 A1 * | 10/2003 | Spillane | B60G 17/0195 701/36 |
| 2015/0203123 A1 | 7/2015 | Darnell et al. | |

* cited by examiner

*Primary Examiner* — Mussa A Shaawat
*Assistant Examiner* — Kyung J Kim
(74) *Attorney, Agent, or Firm* — Jennifer M. Stec; Brooks Kushman P.C.

(57) ABSTRACT

A controller may indicate a low-traction mode of a vehicle when a longitudinal tracking accumulation exceeds a first threshold value and a lateral response accumulation exceeds a second threshold value. The longitudinal tracking accumulation may measure a tally of activation of a traction control system over time. The lateral response accumulation may measure a comparison of the vehicle yaw-rate to a driver-desired model-based prediction of the yaw-rate. The controller may indicate the low-traction mode by providing a recommendation to switch to the low-traction mode in a human-machine interface screen of the vehicle, or by automatically adjusting the operational mode of at least one electronic control unit of the vehicle to implement the low-traction mode.

18 Claims, 4 Drawing Sheets

US 10,035,510 B2

ADAPTIVE DRIVE CONTROL LOW-TRACTION DETECTION AND MODE SELECTION

TECHNICAL FIELD

Aspects of the disclosure generally relate to adaptive drive control surface condition detection and mode selection.

BACKGROUND

Various vehicle subsystems are known to operate in different configuration modes to suit different conditions, which are changing on a long-term basis. For example, automatic transmissions can be controlled in sport, winter, economy, and manual configuration modes in which the changes between gear ratios and other subsystem control parameters are modified to suit the prevailing conditions or the driver's preferences. Electric active and adaptive suspension systems are known with on-road and off-road configuration modes. Power steering systems can be operated in different configurations modes where the level of assistance varies.

Conventionally, operation of each vehicle subsystem is manually controlled by the driver based on preference and experience. As the number of controllable subsystems increases, the driver may face an increasing number of choices of which configuration modes to select for each subsystem based on context and situation. In addition to the merely increasing number of choices available, this situation also increases the potential for unexpected system interactions as well. Unless the driver is very experienced, this complicated situation may result in unintended vehicle behaviors.

SUMMARY

In one or more illustrative embodiments, a system includes a controller programmed to indicate a low-traction mode of a vehicle when a longitudinal tracking accumulation exceeds a first threshold value and a lateral response accumulation exceeds a second threshold value, the longitudinal tracking accumulation measuring a tally of activation of a traction control system over time, the lateral response accumulation measuring a comparison of vehicle yaw rate to a driver-desired model-based prediction of the vehicle yaw rate.

In one or more illustrative embodiments, a method includes computing, for a vehicle, a longitudinal tracking accumulation (LTA) measuring a tally of activation of a traction control system over time, and a lateral response accumulation (LRA) measuring a comparison of the vehicle yaw-rate to a driver-desired model-based prediction of the yaw-rate; and indicating a low-traction mode to be applied to the vehicle based on analyzing the LTA and LRA and weather state information.

In one or more illustrative embodiments, non-transitory computer-readable medium embodying instructions that, when executed by one or more processors of a vehicle controller, cause the controller to compute a longitudinal tracking accumulation (LTA) measuring a tally of activations of a traction control system over time; compute a lateral response accumulation (LRA) measuring a comparison of vehicle yaw rate to a prediction of the vehicle yaw rate; analyze the LTA and LRA to determine whether a low-traction mode is indicated; and based on system settings, provide a recommendation to switch to the low-traction mode in a human-machine interface screen of the vehicle or automatically adjust an operational mode of at least one electronic control unit of the vehicle to implement the low-traction mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Systems that automatically adjust operational modes of vehicle controllers may be referred to as vehicle adaptive drive control (ADC) systems. In an example, a vehicle may utilize a suspension setting ADC to automatically select between sport, normal, and comfort suspension modes to adapt to meet road grade roughness conditions and facilitate curve negotiation. In another example, the vehicle may utilize a performance/economy ADC to automatically engage an eco-mode in which fuel consumption and performance is reduced.

A system and method for ADC low-traction (ADC-LT) may be configured to automatically detect and engage a slippery surface mode when required by current driving conditions. In addition to the ADC decision-making automatically selecting sport, normal, and comfort modes to adapt to meet rough road conditions, curve negotiation, and undulating curves, the LT-mode may be conditionally automatically selected. The ADC-LT detects slippery conditions based on a multi-dimensional computational approach according to lateral and longitudinal anomaly detections and accumulation, and connected telematics information. The ADC-LT may be configured to automatically change the traction mode or to provide recommendations to the driver to change the traction mode. Further aspects of the ADC-LT are described in detail herein.

Figure 1:
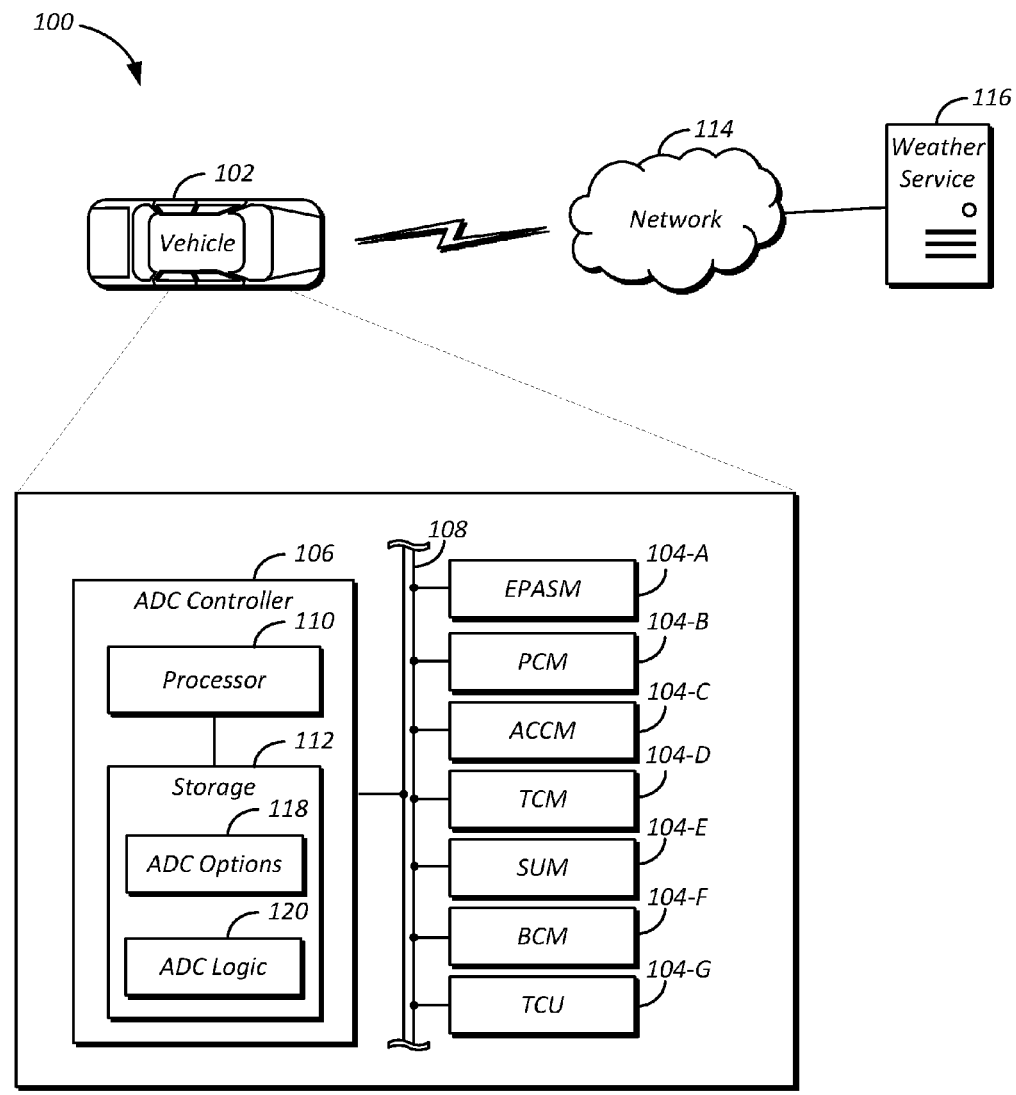
FIG. 1 illustrates an example system for implementing Adaptive Drive Control (ADC) Low-Traction detection and mode selection (ADC-LT) in a vehicle.

FIG. 1 illustrates an example system 100 for implementing adaptive drive control (ADC) low-traction detection and mode selection in a vehicle 102. The system 100 includes a vehicle 102 having a plurality of electronic control units (ECUs) 104 in communication with one another and with an ADC controller 106 over one or more vehicle buses 108. The vehicle 102 may additionally be in communication with a weather service 116 over a network 114. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicle 102 may have different capabilities with respect to passenger capacity, towing ability and capacity, and storage volume.

The vehicle 102 may include a plurality of ECUs 104 configured to perform and manage various vehicle 102 functions under the power of the vehicle battery and/or drivetrain. The ECUs 104 may be computing devices including hardware processors configured to execute software and/or firmware to perform the operations of the ECUs 104 discussed herein. As depicted in the illustrated example, the vehicle ECUs 104 are represented as discrete ECUs 104-A through 104-G. However, the vehicle ECUs 104 may share physical hardware, firmware, and/or software, such that the functionality from multiple ECUs 104 may be integrated into a single ECU 104, and the functionality of various such ECUs 104 may be distributed across a plurality of ECUs 104.

The vehicle ECUs 104 may include components of the vehicle 102 that provide assistance during driving. As some non-limiting vehicle ECUs 104 examples, the vehicle 102 may include an electronic power-steering assist system module (EPASM) 104-A, a powertrain control module (PCM) 104-B, an adaptive cruise control module (ACCM) 104-C (or in other vehicles a cooperative adaptive cruise control system (CACC), a transmission control module (TCM) 104-D, a suspension control module (SUM) 104-E, and a brake control module (BCM) 104-F.

The EPASM 104-A may be configured to use an electric motor to provide mechanical steering assistance to the driver, thereby reducing the effort required from the driver to steer the vehicle 102. The PCM 104-B may be configured to facilitate control coordination between one or more of the engine, transmission, driveshaft, or final drive of the vehicle 102. The ACCM 104-C may be configured to automatically control speed of the vehicle 102. The TCM 104-D may be configured to utilize engine load and vehicle speed information to determine a gear position to be established in the transmission. The SUM 104-E may be configured to control suspension aspects of the vehicle 102 such as control of damping of the vehicle 102 suspension, and the BCM 104-F may be configured to control braking aspects of the vehicle 102 (e.g., antilock braking systems (ABS), etc.). It should be noted that the present disclosure illustrates only an example set of ECUs 104, and vehicles 102 may include more, fewer, or different ECUs 104 than those described herein.

The ECUs 104 may be configured to operate in various operational modes, such that in each mode, the behavior of the ECU 104 may be optimized for different conditions. In an example, one or more ECUs 104 may be configured to operate in settings such as comfort, normal, or sport. For instance, when driving at a substantially low speed (e.g., slower than 25 miles per hour), the EPASM 112 may be configured to operate at comfort settings to reduce driver steering efforts. At higher speeds (e.g., up to 55 miles per hour), the EPASM 112 may be configured to switch to the normal settings. At still higher speeds, the EPASM 112 may be configured to switch to the sports setting. As another example, the ECUs 104 may be configured to switch to appropriate mode settings based on driving conditions. For instance, the SUM 104-E may be configured to switch to a comfort mode when driving over rough road, and to switch to a normal mode when driving over smooth pavement.

The ADC controller 106 may be configured to determine the operational modes into which to place the one or more ECUs 104 of the vehicle 102. The ADC controller 106 may include any number of processors 110, ASICs, ICs, memory/storage 112 (e.g., FLASH, ROM, RAM, EPROM, and/or EEPROM) and software code to co-act with one another to perform a series of operations. For example, the storage 112 may include ADC logic 118 code that, when executed by the one or more processors 110 of the ADC controller 106, causes the ADC controller 106 to perform one or more of the operations described in detail herein. The storage 112 may also include ADC options 120 configuring aspects of the operation of the ADC logic 118.

The ADC controller 106 communicates with other vehicle systems, sensors, and controllers for coordinating their function. In an example, ADC controller 106 communicates with the other vehicle ECUs, sensors, and/or systems (e.g., the PCM 104-B, the TCM 104-D, etc.) over one or more wired or wireless vehicle bus connections 108 using common bus protocols (e.g., CAN, LIN, etc.). These input signals may include, as some non-limiting examples, a brake pedal state $S_{bp}$ that corresponds to a brake pedal position (e.g., applied or released), a brake pressure $P_{brk}$ signal that corresponds to an actual brake pressure value within the brake system (e.g., brake line pressure or master cylinder pressure, brake torque), engine speed ($N_e$), vehicle speed, ($V_{eh}$), steering wheel position, turning signal activation, and/or accelerator pedal position (APP) that corresponds to a driver request for propulsion, or whether a traction control system (TCS) alert is provided.

Moreover, the ADC controller 106 may also be configured to receive additional information from sources external to the vehicle 102 via the Telematics Control Unit (TCU) 104-G (and/or via the Ford SYNC controller). This additional information may include, as some possibilities, information from infrastructure (e.g., vehicle to vehicle (V2V)/vehicle to infrastructure (V2I) using dedicated short range communications (DSRC) or another protocol), vehicle sensors (e.g., cameras, light detection and ranging (LIDAR), Sonar, GNSS, HD map, solar pyrometer, rain sensor, ambient temperature, pressure and humidity, etc.). In an example, the TCU 104-G may be configured to allow the vehicle 102 to receive information over a network 114 from a weather service 116.

The weather service 116 may be configured to provide information regarding current and forecast weather conditions. The information regarding weather conditions may include, for example, temperature (e.g., current, forecast low, forecast high, etc.), type of precipitation (e.g., rain, snow, sleet, hail, etc.), likelihood of precipitation (e.g., as a percentage), allergen status (e.g., pollen level, smog level, etc.) among other possibilities. In some cases, forecast weather conditions may be specified over a daily timescale, while in other cases, forecast weather conditions may be specified over a shorter timescale, such as hourly. The weather service 116 may be configured to receive requests for current and/or forecast weather conditions for a specified geographic location and date/time, and respond to the requests with the requested information.

Based on the received information, the ADC controller 106 may communicate with the ECUs 104 to configure in which of the various operational modes the ECUs 104 should operate. Although it is shown as a single separate controller, the ADC controller 106 may be integrated with one or more other vehicle 102 controllers, and/or may include multiple controllers that may be used to control multiple vehicle systems according to an overall vehicle control logic or software.

Figure 2:
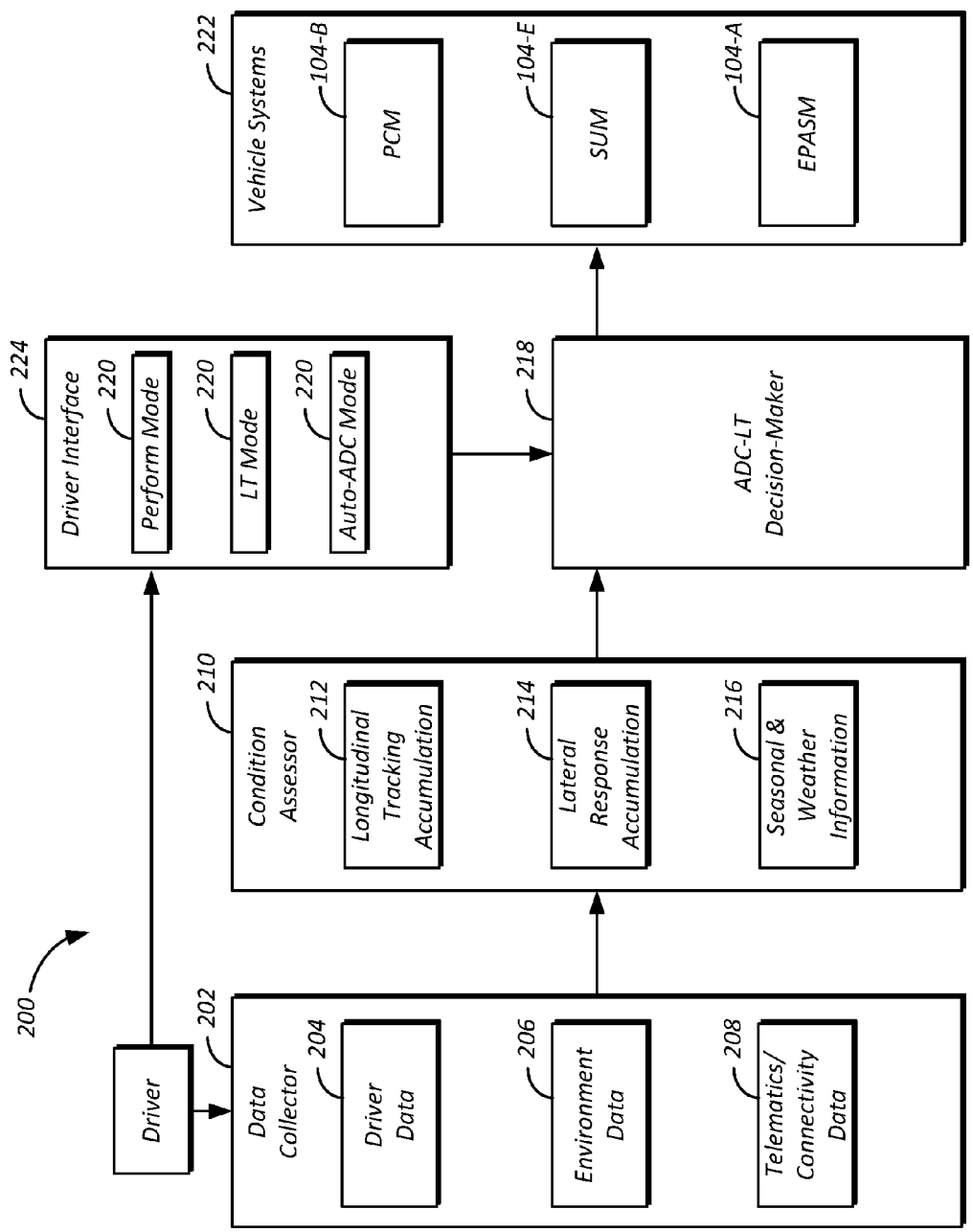
FIG. 2 illustrates an example block representation of a data flow for the ADC controller.

FIG. 2 illustrates an example block representation of a data flow 200 for the ADC controller 106. In the example, the data flow 200 may be implemented at least in part by the ADC logic 118 of the ADC controller 106 described above. A data collector 202 receives vehicle driver data 204, environment data 206, and telematics connectivity data 208. A condition assessor 210 receives the data from the data collector 202, and uses a longitudinal tracking accumulation (LTA) 212, a lateral response accumulation (LRA) 214, and an analysis of connected seasonal and weather information (weather state) 216 to determine current vehicle 102 conditions. A decision-maker 218 receives the current vehicle 102 condition information from the condition assessor 210, and based on the information determines a mode 220 into which to place various vehicle systems 222 (which may include one or more of the vehicle ECUs 104 described in detail above). Based on options selected by the driver from a driver interface 224, the decision-maker 218 either automatically applies mode 220 changes to vehicle systems 222 (e.g., the ECUs 104) or provides a recommendation to the driver to change the mode 220 to an appropriate mode for the conditions being experienced by the vehicle 102. While an example data flow 200 is shown in FIG. 2, the example elements illustrated in the Figure are not intended to be limiting. Indeed, the data flow 200 may have more or fewer elements, and additional or alternative operations, aspects, and/or implementations may be used.

The driver data 204 may include various control inputs from the driver of the vehicle 102. These inputs may include, for example, input to human machine interface (HMI) controls related to control of the vehicle, such as $S_{bp}$, $P_{brk}$, APP, steering wheel position, or turning signal activation. These inputs may also include user input to a touch screen or other HMI of the vehicle 102 for receiving settings or other input not directly related to the driving task, such as climate control settings, infotainment settings, and selection of other vehicle 102 settings.

The vehicle and environment data 206 may include information related to environmental conditions measured by the vehicle 102. In an example, the environment data 206 may include pitch, yaw, yaw-rate, model-based predicted yaw-rate or other telemetry information retrieved from a vehicle stability control system or other sensor systems. In another example, the environment data 206 may include rain sensor or sun-load sensor information regarding weather conditions measured by the vehicle 102.

The telematics/connectivity data 208 may include information related to environmental conditions measured external to the vehicle 102. In an example, the telematics/connectivity data 208 may include information regarding current and forecast weather conditions retrieved from the weather service 116.

The condition assessor 210 may be configured to receive the driver data 204, environment data 206, and telematics connectivity data 208 from the data collector 202, and compute the LTA 212, LRA 214, and weather state 216.

The LTA 212 value may be determined based on analysis and accumulation of vehicle traction control activation. The LTA 212 may be provided to the decision-maker 218 as a value with a range from 0-1, with values closer to 1 reflecting a greater likelihood of longitudinal slippery conditions, and values closer to 0 reflecting relatively lesser likelihood of longitudinally slippery conditions. To compute the LTA 212, the condition assessor 210 may incorporate accumulators to track the activation of the Traction Control System (TCS) alert. The TCS activation may be obtained, in an example, from over one or more vehicle buses 108 (e.g., a CAN bus). If TCS is activated, the condition assessor 210 generates a digital flag value and increments a TCS counter. In an example, this is done by creating an intermediate flag that checks the TCS state as follows:

(1) If TCS active→flag=1
    If TCS inactive→flag=0

Accordingly, if the TCS is activated (e.g., the flag is 1), the LTA 212 accumulation may be computed as follows:

$$LTA(k) = LTA(k-1) + e \qquad (1)$$

Where
  k is a cycle number of performing the accumulation; and
  e is an increment value (e.g., e=0.25 as mentioned above).

The LTA 212 may be re-set to zero after a scheduled period. In an example, the reset period may be from one to three minutes of the TCS remaining inactive.

In another embodiment, the LTA 212 may be computed and incremented as an exponential filter for TCS activations:

$$LTA_k = \alpha * TCSstatus + (1-\alpha) * LTA_{k-1}$$

where the LTA value is between 0 and 1; and
where α is an experimentally determined time constant (between 0 and 1, e.g., 0.15) that determines how quickly the counter can change in n intervals.

The LRA 214 value may be determined to provide analysis and accumulation of lateral anomalies and excursions from the driver requested lateral movement. The LRA 214 may be provided to the decision-maker 218 as a value with a range from 0-1, with values closer to 1 reflecting a greater likelihood of lateral slippery conditions, and values closer to 0 reflecting a lesser likelihood of slippery conditions.

In an example, the LRA 214 may be computed as follows:

$$LRA = \frac{\text{abs}(L_{des} - L_{pred})}{\gamma} \qquad (2)$$

Where
  $L_{des}$ is the real-time measurement of the vehicle yaw-rate as a result of driver desired steering inputs and control actions;
  $L_{pred}$ is a model-based prediction of the yaw-rate computed as known in the art from driver desired steering and control inputs, and vehicle parameters and obtained from the vehicle network (e.g., from the electronics stability control system of the vehicle 102); and
  γ is a scaling factor of tunable maximum yaw-rate deviation (e.g., a scaling factor of 3-5 degrees per second).

The weather information 216 may be determined using one or more weather rules based on the environment data 206 and the telematics/connectivity data 208. For instance, a rule may specify a $Weather_{state}$ of 1 to categorize a snowing environmental condition identified by the sensors of the vehicle 102 via data from the weather service 116 or 0 otherwise. As another possibility, a rule may specify a Weather$_{state}$ of 1 to categorize a temperature below freezing condition or 0 otherwise. As yet a further example rule, a rule may specify a Weather$_{state}$ of 1 to categorize a black ice condition when ambient temperature (e.g., as measured by a vehicle 102 sensor) is between 0° C. and −3° C. and dew point is about 0° C. It should be noted that these are merely examples, and more, fewer, and different weather rules may be used.

Alternatively the Weather$_{state}$ could be determined as a continuous function based on other information reported from the weather data provider like snow (or rain fall rate) as $$Weather_{condition}(k) = \begin{cases} 0 \text{ if snow fall rate of 0 cm/hr} \\ 1 \text{ if snow fall rate} \geq 5 \text{ cm/hr} \end{cases}$$

A continuous linear increasing function between 0 and 1 is then obtained.

Or the weather condition could be based on estimated snow (or rain water accumulation) depth accumulation on the roadway as determined by GPS or other means at the location or ahead of the vehicle on the vehicles route in a similar way.

In these cases:

$$Weather_{state}(k)=(1-\alpha)*Weather_{state}(k-1)+ \alpha*Weather_{condition}(k) \quad (3)$$

where α is a number between 0 and 1 (e.g., 0.1).

Regardless of approach, the classification of weather conditions to determine the Weather$_{state}$ value may be used to improve identification of slippery conditions by the decision-maker 218.

The decision-maker 218 may be configured to determine the mode 220 into which to place the vehicle 102 based on the LTA 212, LRA 214, and weather state 216 received from the condition assessor 210. The operational modes 220 may include, as some examples, sport mode 220, normal mode 220, and Comfort mode 220. Accordingly, the decision-maker 218 may cause the vehicle 102 to adapt to meet road conditions, curve negotiation and undulating curve conditions along the roadway.

More specifically, the decision-maker 218 may be configured to automatically select a low-traction (LT) mode 220 or a normal traction mode 220. For instance, the decision-maker 218 may be configured to select the LT-mode 220 based on an accumulation of anomalies from the LTA 212, from the LRA 214, and from the weather state 216. In an example, the decision whether to select a LT mode 220 or a normal traction mode 220 may be computed as follows:

$$ADC_{LT} = \begin{cases} 1 \text{ if } \begin{cases} LTA > \lambda \\ Weather_{state} = 1 \\ LRA > \theta \end{cases} \\ 0 \text{ otherwise} \end{cases} \quad (4)$$

As indicated in equation (4), the determination of the ADC$_{LT}$ value may be based on the LTA 212, LRA 214, and weather state 216. An ADC$_{LT}$ value of 1 leads to an indication for engagement of the LT mode 220, and an ADC$_{LT}$ value of 0 leads to an indication for disengagement of the LT mode 220. Examples of the tunable threshold values of the constants λ and θ are 0.75 and 0.7, respectively.

Variations on equation (4) are possible. For instance, if the Weather$_{state}$ is defined to be a continuous signal between 0 and 1 instead of a binary 0 or 1, then a threshold could be introduced for the weather term also. As another possible variation, the calculation of ADC$_{LT}$ could also be modified by introducing weighting factors, e.g., numbers between 0 and 1 which allow the developer to determine how much weight should be given to each term. These weighting factors could also be dynamically determined based on confidence in the individual signals at any given time.

The driver interface 224 may be configured to provide the ADC controller 106 with an ability to configure information regarding ADC options 118 for automatic mode selection or for mode recommendation. Using the driver interface 224, the driver may select that the ADC controller 106 set the vehicle 102 into performance mode 220 in which low-traction settings are not utilized, or into low-traction (LT) mode in which low-traction settings are used. As another choice, the driver interface 224 may allow the driver to select an Auto-ADC mode 220 to request that the decision-maker 218 automatically adapt to mode selection for particular driving contexts.

In some examples, the driver interface 224 may further present ADC options 118 for operation of the Auto-ADC mode 220. For instance, the driver interface 224 may allow the driver to select between a first ADC option 118, in which the ADC controller 106 learns and automatically engages the LT-Mode 220 when the decision-maker 218 detects slippery conditions, and a second ADC option 118, in which the ADC controller 106 provides a driver recommendation to engage LT-mode 220 when the decision-maker 218 detects slippery conditions without automatically applying the LT-mode 220.

For instance, in the first option mode, the indication for engagement of the LT mode 220 may result in automatic engagement of the LT mode 220, while in the second option mode, the indication for engagement of the LT mode 220 may result in a recommendation to the driver to engage the LT mode 220. As another example, in the first option mode, the indication for disengagement of the LT mode 220 may result in disengagement of the LT mode 220, while in the second option mode, the indication for disengagement of the LT mode 220 may result in a recommendation to return to the normal traction mode 220. Thus, the decision-maker 218 of the ADC controller 106 may be used to automatically select from or make recommendations to select from operational modes 220 of the vehicle systems 222.

Figure 3:
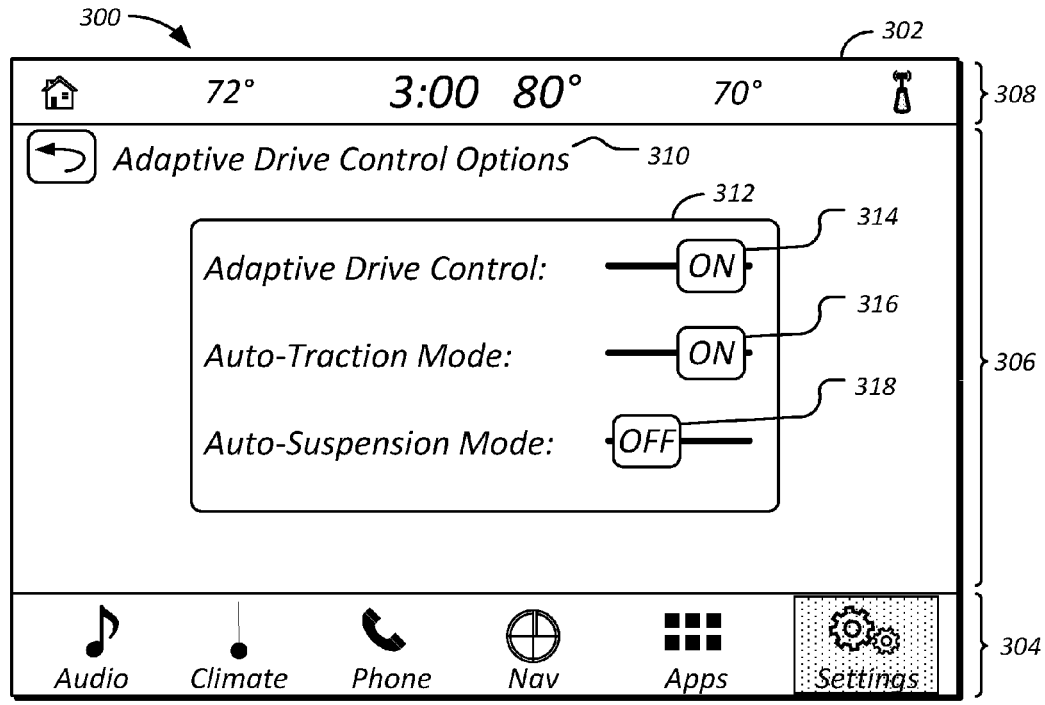
FIG. 3 illustrates an example user interface of the vehicle for configuration of the ADC controller.

FIG. 3 illustrates an example user interface 300 of the vehicle 102 for configuration of the ADC controller 106. In an example, the user interface 300 may be displayed on a head unit or other display 302 of the vehicle 102. The head unit display 302 may be driven, for example, by a video connection of a video controller of the vehicle 102 in communication over the vehicle bus 108 with the ADC controller 106. The user interface 300 may allow the user to configure the ADC options 120 of the ADC controller 106 regarding automatic or manual application of recommended ADC settings. In some examples, the user interface 300 may be displayed responsive to user selection of an ADC configuration option. To facilitate the configuration of the ADS controller 106, driver selections made to the user interface 300 may be provided to the driver interface 224 of the ADC controller 106 over the vehicle bus 108, which in turn may update the ADC options 120 maintained to the storage 112 of the ADC controller 106.

As shown, the user interface 300 includes a category listing 304 of one or more screen of content to be displayed in the main screen area 304 of the head unit display 302. As some examples, the category listing 304 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 302 may be accessed. The user interface 300 may also include a general information area 308 from which time, current temperature, and other information may remain visible to the user, regardless of the specific screen or application that is active in the main screen area 306.

In the main screen area 306, the user interface 300 may include a description label 310 indicating that the user interface 300 is for configuration of the ADC options 120 of the ADC controller 106. The main screen area 306 also includes a configuration panel 312 including the configurable options. These options may include, for example, an ADC enable option 314 allowing the driver to select whether to enable or disable ADC, an automatic traction mode selection option 316 allowing the driver to select between the ADC controller 106 automatically adjusting the traction mode 220 of the vehicle 102 or providing recommendations to the driver to adjust the traction mode 220, and an automatic suspension mode selection option 318 allowing the driver to select between the ADC controller 106 automatically adjusting the suspension mode 220 of the vehicle 102 or providing recommendations to the driver to adjust the suspension mode 220.

Figure 4:
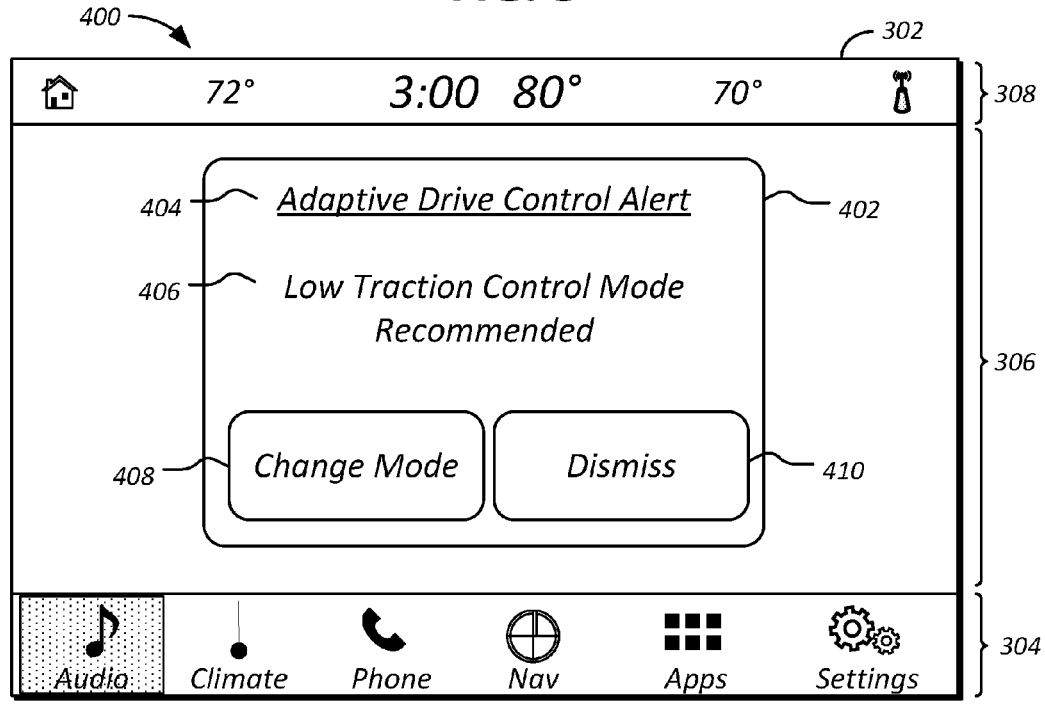
FIG. 4 illustrates an example user interface of the vehicle for displaying an ADC controller recommendation.

FIG. 4 illustrates an example user interface 400 of the vehicle 102 for displaying an ADC controller 106 recommendation 402. The recommendation 402 may be displayed responsive to receipt by the head unit of a message over the vehicle 108 from the ADC controller 106 recommending the change in operational mode 220. As shown, the recommendation 402 includes a title 404 to indicate to the driver that the recommendation 402 is generated from the ADC controller 106. The recommendation 402 may further include a description label 406 describing the recommended change in mode 220 (e.g., that low-traction mode 220 is recommended). The recommendation 402 may also include a change mode button 408 that, when selected by the driver, is configured to cause the ADC controller 106 to receive permission to apply the suggested mode 220 to the vehicle systems 222. The alert 402 may also include a dismiss button 410 that, when selected by the driver, is configured to dismiss the recommendation 402 without adjusting the operational mode 220.

Figure 5:
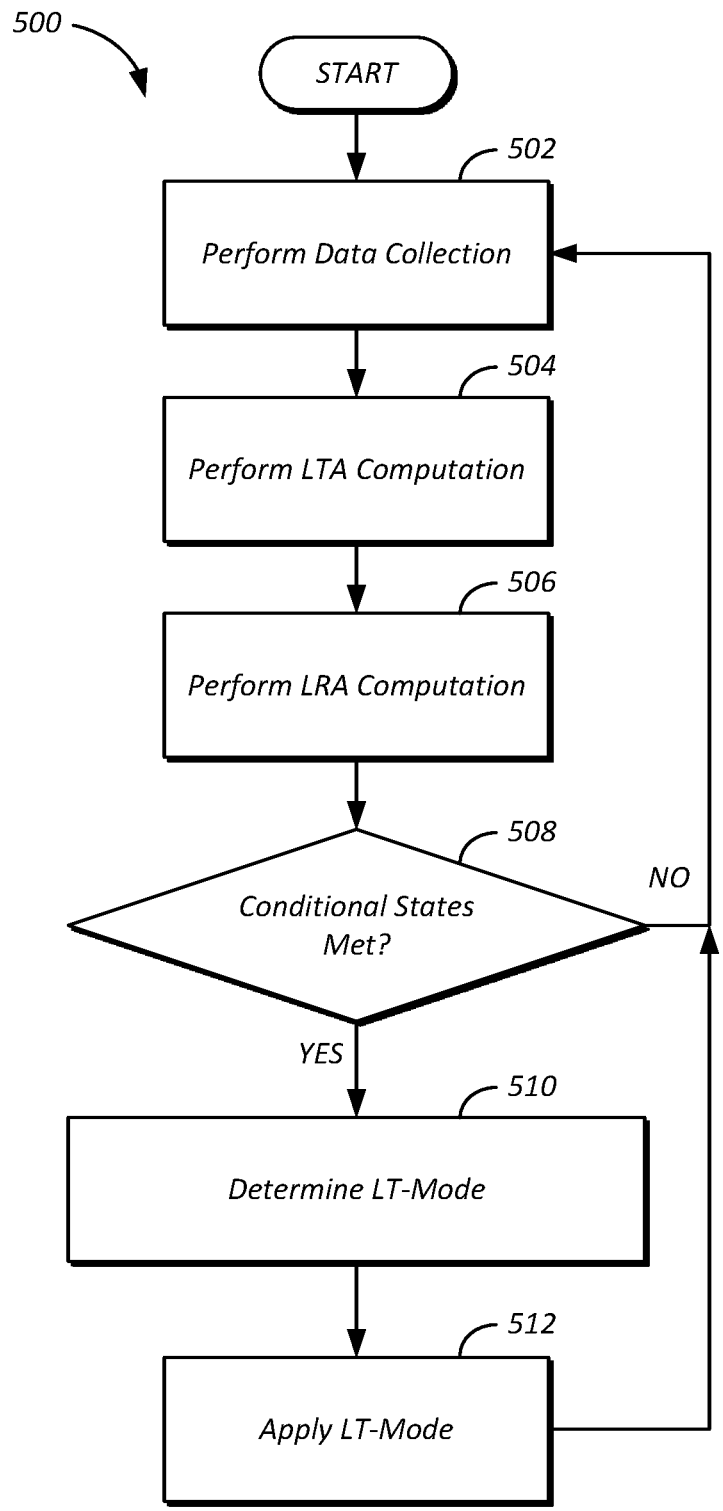
FIG. 5 illustrates an example process for ADC detection and mode selection in a vehicle 102.

FIG. 5 illustrates an example process 500 for ADC LT detection and mode selection in a vehicle 102. In an example, the process 500 may be performed using the ADC controller 106 in accordance with the data flow 200 discussed in detail above.

At operation 502, the ADC controller 106 performs data collection. In an example, the data collector 202 of the ADC controller 106 receives the driver data 204, the environment data 206, and the connectivity data 208.

At 504, the ADC controller 106 performs LTA 212 computation, and at operation 506, the ADC controller 106 performs LRA 214 computation. In an example, the LTA 212 and LRA 214 anomaly detection and accumulations may be performed by the condition assessor 210 of the ADC controller 106 as discussed above.

At operation 508, the ADC controller 106 determines which conditional states of the ADC determination are met. In an example, the decision-maker 218 of the ADC controller 106 analyzes the LTA 212, LRA 214, and weather state 216 to determine the $ADC_{LT}$ value using the equation (1).

At 510, the ADC controller 106 determines the LT mode 220 for the vehicle 102. In an example, the decision-maker 218 of the ADC controller 106 determines the mode 220 into which to place the vehicle 102 based on the $ADC_{LT}$ value and the driver options specified via the driver interface 224.

At operation 512, the ADC controller 106 applies the determined LT-mode 220 to the vehicle systems 222. In an example, the ADC controller 106 may automatically adjust the operational mode 220 of the vehicle systems 222. In another example, the ADC controller 106 may display the recommendation 402 to the user to allow the user to manually accept or reject the recommended operational mode 220. After operation 512, the process 500 returns to operation 502.

Computing devices described herein, such as the ECUs 104 and ADC controller 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

What is claimed is:

1. A system comprising:
   a controller programmed to indicate a low-traction mode of a vehicle when a longitudinal tracking accumulation exceeds a first threshold value and a lateral response accumulation exceeds a second threshold value, the longitudinal tracking accumulation measuring a tally of activation of a traction control system over time, the lateral response accumulation measuring a comparison of vehicle yaw rate to a driver-desired model-based prediction of the vehicle yaw rate.

2. The system of claim 1, wherein the controller is further programmed to utilize weather information to confirm the low-traction mode.

3. The system of claim 1, wherein the controller is further programmed to indicate the low-traction mode by providing a recommendation to switch to the low-traction mode in a human-machine interface screen of the vehicle.

4. The system of claim 1, wherein the controller is further programmed to indicate the low-traction mode by automatically adjusting an operational mode of at least one electronic control unit (ECU) of the vehicle to implement the low-traction mode.

5. The system of claim 1, wherein a current cycle of the longitudinal tracking accumulation is computed by determining a value based on a quantity of traction control system alerts raised during a predefined time period, and adding the value to a previous cycle value of the longitudinal tracking accumulation.

6. The system of claim 5, wherein the predefined time period is one minute.

7. The system of claim 1, wherein the lateral response accumulation is computed according to an absolute value difference between the vehicle yaw rate and the driver-desired model-based prediction of the vehicle yaw rate divided by a tunable maximum yaw rate deviation constant.

8. A method comprising:
computing, for a vehicle, a longitudinal tracking accumulation (LTA) measuring a tally of activations of a traction control system over time, and a lateral response accumulation (LRA) measuring a comparison of vehicle yaw rate to a model-based prediction of the yaw rate; and
indicating a low-traction mode to be applied to the vehicle based on analyzing the LTA and LRA and weather state information.

9. The method of claim 8, further comprising indicating the low-traction mode by providing a recommendation to switch to the low-traction mode in a human-machine interface screen of the vehicle.

10. The method of claim 8, further comprising indicating the low-traction mode by automatically adjusting an operational mode of at least one electronic control unit of the vehicle to implement the low-traction mode.

11. The method of claim 8, further comprising computing a current cycle of the LTA by determining a value based on a quantity of traction control system alerts raised during a predefined time period, and adding that value to a previous cycle value of the LTA.

12. The method of claim 11, wherein the predefined time period is from one to three minutes.

13. The method of claim 8, further comprising computing the lateral response accumulation according to an absolute difference of the vehicle yaw rate and a selected model-based prediction of the vehicle yaw rate divided by a tunable constant representing a maximum yaw rate deviation.

14. A non-transitory computer-readable medium embodying instructions that, when executed by one or more processors of a vehicle controller, cause the controller to:
compute a longitudinal tracking accumulation (LTA) measuring a tally of activations of a traction control system over time;
compute a lateral response accumulation (LRA) measuring a comparison of vehicle yaw rate to a prediction of the vehicle yaw rate;
analyze the LTA and LRA to determine whether a low-traction mode is indicated; and
based on system settings, provide a recommendation to switch to the low-traction mode in a human-machine interface screen of the vehicle or automatically adjust an operational mode of at least one electronic control unit of the vehicle to implement the low-traction mode.

15. The medium of claim 14, further comprising instructions to cause the controller to compute a current cycle of the LTA by determining a value based on a quantity of traction control system alerts occurring during a predefined time period, and adding the value to a previous cycle value of the LTA.

16. The medium of claim 15, wherein the predefined time period is from one to three minutes.

17. The medium of claim 14, further comprising instructions to cause the controller to compute the lateral response accumulation according to an absolute value difference between the vehicle yaw rate and a prediction of the yaw rate divided by a specified maximum yaw rate deviation.

18. The medium of claim 14, further comprising instructions to cause the controller to receive the system settings in response to user input to a human-machine interface screen for specifying whether to provide the recommendation or automatically adjust the operational mode.

* * * * *